April 23, 1968  H. C. FOGLE  3,379,120
BUN MOLDING APPARATUS
Filed Dec. 7, 1966  2 Sheets-Sheet 1
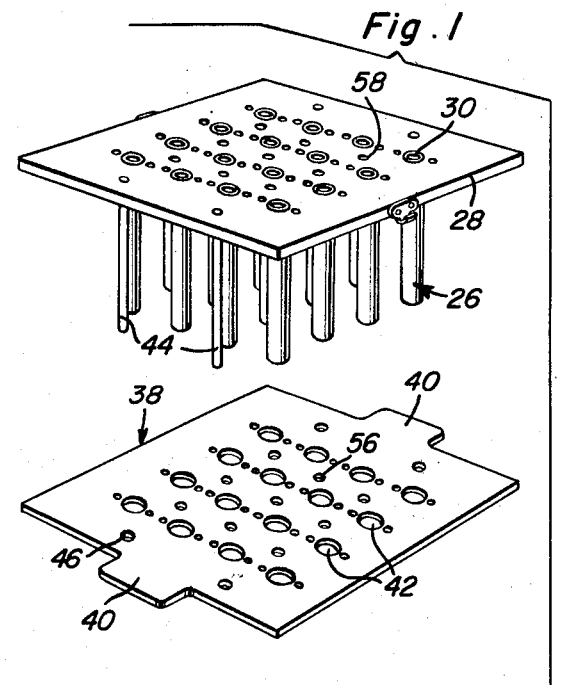
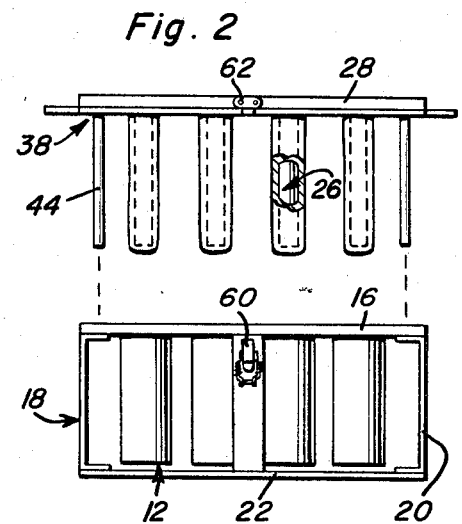
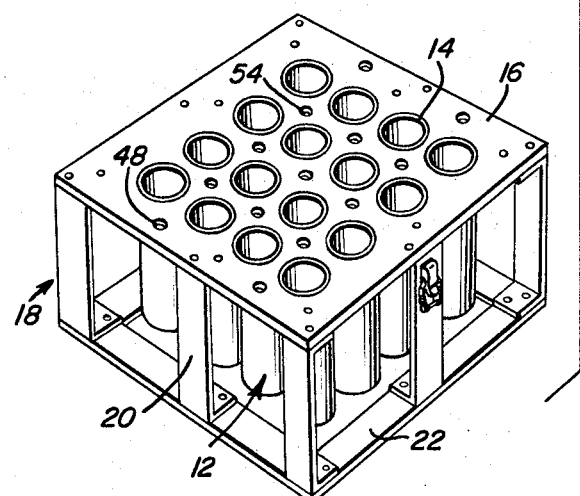
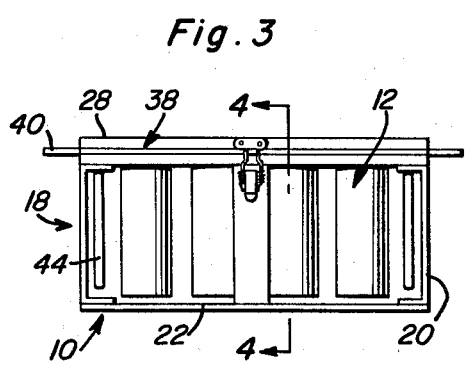
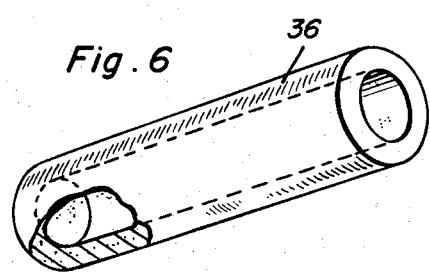
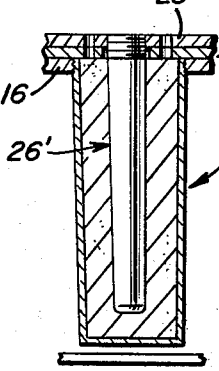
Harry C. Fogle
INVENTOR.

April 23, 1968  H. C. FOGLE  3,379,120
BUN MOLDING APPARATUS
Filed Dec. 7, 1966  2 Sheets-Sheet 2

Harry C. Fogle
INVENTOR.

United States Patent Office
3,379,120
Patented Apr. 23, 1968

3,379,120
BUN MOLDING APPARATUS
Harry C. Fogle, P.O. Box 245, Oilton, Okla. 74052
Filed Dec. 7, 1966, Ser. No. 599,967
9 Claims. (Cl. 99—439)

ABSTRACT OF THE DISCLOSURE

A bun molding device including a plurality of frame mounted molding cups receiving relatively smaller frame mounted molding cores coaxially therein for the molding of hollow buns. A stripping plate is removably mounted on the core frame to strip the buns therefrom after a removal of the cores from the cups.

---

The instant invention relates to new and useful improvements in bun molding devices, and more particularly relates to a bun molding apparatus which will enable the production of a closed end hollow frankfurter receiving bun in a rapid, simplified and economical manner.

A particularly significant object of the instant invention resides in the provision of apparatus which enables the simultaneous production of a plurality of perfectly formed frankfurter buns with the difficulty normally associated with the removal of such buns from the molding device being completely eliminated.

Also, it is an important object of the instant invention to provide a device which consistently forms a plurality of perfectly molded hollow buns having one sealed end for the retention of the food therein, be it the frankfurter itself, chili, condiments, or the like.

Further, it is an object of the instant invention to provide a sturdy device capable of being repeatedly used with there being, aside from a pair of simple latches, no operable mechanical parts such as hinges or the like which could cause a malfunctioning or misalignment of the apparatus or the elements associated therewith.

Basically, the apparatus of the instant invention includes a plurality of hollow cylindrical molding cups which telescopically receive molding cores coaxially therein, the cores being located in spaced relation to the interior of the corresponding cups so as to define bun molding spaces therebetween. Finally, a stripping plate is mountable about the outer ends of the cores so as to, upon a removal of the cores from the cups with the buns molded thereon, easily, efficiently and quickly strip the buns from the cores in a manner which provides perfectly formed buns.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an exploded perspective view of the three elements comprising the apparatus of the instant invention;

FIGURE 2 is an exploded side elevational view of the apparatus with the dough placed on the molding cores prior to an introduction of the cores into the molding cups;

FIGURE 3 is a side elevational view of the assembled apparatus;

FIGURE 6 is a perspective view of a molded bun produced using the apparatus of the instant invention, and FIGURE 7 is a partial cross-sectional view illustrating a modified form of molding cup and molding core longitudinally tapered to facilitate the removal of the buns.

Figure 4:
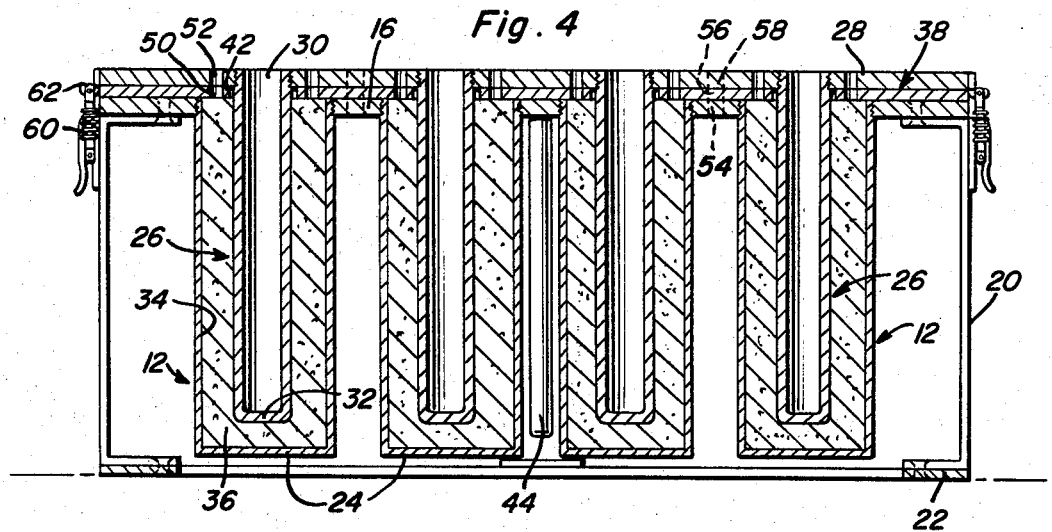
FIGURE 4 is an enlarged cross-sectional view taken substantially on a plane passing along line 4—4 in FIGURE 3.

Referring now more specifically to the drawings, reference numeral 10 is used to generally designate the bun molding apparatus comprising the instant invention. This apparatus 10 includes a plurality of elongated hollow cylindrical molding cups 12, each having an upper open end 14 secured to and opening through a flat cup mounting plate 16. The plate 16 in turn constitutes the upper portion of a support frame 18 which in addition includes a plurality of upright flat bars 20 engaged between the cup supporting plate 16 and a lower horizontally orientated rectangular frame 22 located below the closed bottoms 24 of the cups 12. As will be noted from FIGURE 1, the cups 12 will preferably be arranged in a rectangular pattern.

Cooperating with the cylindrical molding cups 12 are a plurality of molding cores 26, each rigidly affixed to and depending from a base or core supporting plate 28 which has a shape and size corresponding to that of the plate 16. These cores 26, noting FIGURE 4, are hollow and include an open upper end 30 which opens through the plate 28, the lower end 32 of each of the cores 26 being closed. The cores 26 are fixed to the plate 28 in the same pattern as the cups 12 are fixed to their supporting plate 16 for a simultaneous coaxial reception of each of the cores 26 within the cups 12. With continued reference to FIGURE 4, it will be noted that each core 26, while cylindrical so as to correspond to the cylindrical shape of the cups 12, is smaller in size so as to define a molding space between each core 26 and the surrounding inner face 34 of the corresponding cup 12, as well as a similar space between the closed bottom 32 of the core 26 and the closed bottom 24 of the cup 12. In this manner, a cylindrical hollow bun 36 can be formed with a completely sealed bottom end.

The third element of the apparatus 10 comprises a stripping plate 38 which is rectangular and corresponds in size to the plates 16 and 28, aside from two opposed laterally projecting handles 40 integrally formed therewith. The stripping plate 38 includes a series of apertures 42 therein arranged so as to correspond to the arrangement of the cups 12 and cores 26. These apertures, again noting FIGURE 4, receive the cores 26 therethrough and are of a cross-section slightly greater than that of the corresponding cores, and at the same time substantially less than the cross-sectional size of the corresponding cups 12.

In order to insure a proper alignment of the cores 26, stripping plate 38 and cup 12, cooperating guide means are provided on the three plates 16, 28 and 38. This guide means comprises a pair of elongated guide rods 44 affixed in depending relationship to the plate 28 adjacent a pair of opposed edges. These four guide rods are received through four guide holes 46 in the stripping plate and four similar guide holes 48 in the cup mounting plate 16, thereby insuring the desired coaxial relationship of the cores 26, stripping plate apertures 42 and cylindrical molding cups 12, the guide holes 46 and 48 of course being of a size so as to quite closely receive the guide rods 44.

In order to allow for the escape of any trapped air and insure a proper rising and baking of the dough in the formation of the buns 36, it will be noted that both the stripping plate 38 and the core mounting plate or base 28 immediately thereabove are provided with aligned holes 50 and 52, a pair of such holes 50 and 52 being positioned immediately adjacent each of the apertures 42 and cores 26 so as to communicate directly with the interior of the relatively larger associated cup 12, also as clearly illustrated in FIGURE 4. Further, in order to allow for the free passage of heat in and about the apparatus 10, it will be noted that, between each of the rows of cups 12, cores 26 and apertures 42 are a series of aligned holes 54, 56 and 58 in the respective plates 16, 38 and 28. With these aligned holes 54, 56 and 58, it will be appreciated that the heat can pass freely about the molding cups 12, the open sides of the cup supporting frame 18 also allowing for the free movement of the heat. Finally, in order to lock the cores 26 within the corresponding cups 12, a pair of latch or lock elements 60 are provided on opposite sides of the cup supporting frame 18, these latch elements cooperating and releasably engaging keeper elements 62 mounted on the corresponding sides of the core suspending plate 28. These cooperating latches and keepers 60 and 62 can be of any suitable type capable of being quickly engaged and disengaged.

Figure 5:
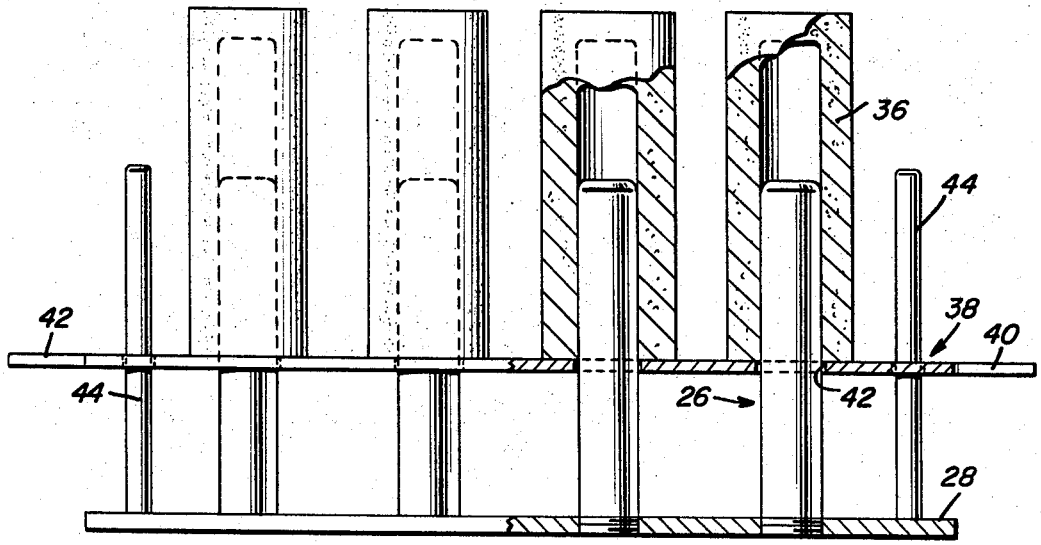
FIGURE 5 is an elevational view, partially in section, illustrating the use of the stripping plate in removing the finished buns from the molding cores.

In actual use, the dough is manually placed or molded about each of the molding cores 26 as indicated in FIG-URE 2, this being done of course after the stripping plate 38 is slid inwardly on the cores 26 so as to lie against the plate 28. The cores are then introduced into the cups 12, guided by the guide rods 44 received within the holes 48, after which the three elements are locked together and the entire apparatus 10 introduced into an oven for the baking of the buns 36. During the actual baking, the dough will tend to rise both into the stripping plate holes 50 and into that portion of each of the enlarged stripping plate apertures 42 which surround each of the cores 26, thereby tending to lock each of the buns 36 to the stripping plate 38. After the baking step is completed, the apparatus 10 will be removed from the oven, the latches 60 released, and the stripping plate 38 and cores 26 moved away from the cups 12, the buns 36 smoothly moving out of the molding cups 12 due to the partial locking of each of the buns 36 to the stripping plate 38. This movement of the buns 36 out of the cups 12 can be facilitated by lightly greasing the inner surfaces of the cups 12 should this be necessary. However, in most instances, the baked buns 36 will actually adhere to the cores 26 and stripping plate 38 sufficiently so as to allow them to be slipped easily from the smooth interior surfaces of the cups 12. Once the buns 36 have been removed in this manner from the cups 12, the bun carrying cores 26, as well as the plates 28 and 38, are inverted, as shown in FIGURE 5, and the stripping plate 38 moved upwardly so as to strip the buns 36 from the cores 26, the final step involving merely a simple gathering of the buns 36 from the flat stripping plate 38. In this manner, there is no possibility of damage to the buns 36. Further, it is not necessary to either open the individual cups 12 to obtain access to the buns, or devise some method of in effect scooping or digging the buns out of the cups 12. By the same token, the removal of the cores 26 from the buns is also greatly simplified, with the final removal of the buns 36 resulting in the presentation of the buns in a substantially free manner on the tray-like stripping plate 38. The above described use of the apparatus is extremely simple and rapid, insuring a plurality of perfectly formed buns 36 every time, these buns having a completely sealed end so as to retain any foodstuff introduced thereinto.

In conclusion, attention is directed specifically to FIG-URE 7 wherein a slightly modified cup and core combination has been illustrated and indicated by reference numerals 12' and 26'. As will be appreciated from the drawing, both the cup 12' and the corresponding molding core 26' are longitudinally tapered to a slight degree with it being contemplated that this taper facilitate both the removal of the bun from the molding cup 12' and the subsequent removal of the bun from the molding core 26' in an obvious manner. This tapered configuration of both the cup 12' and the core 26' is effected through a progressive narrowing of each outwardly from the corresponding plate mounted end which constitutes the greatest cross-sectional dimension.

It will of course be noted that the apparatus can, through a change in the size of the elements, produce buns of any desirable size. Likewise, slight changes in the shape thereof can also be effected, as long as the basic relationship between the various elements is maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bun molding apparatus comprising at least one elongated hollow molding cup, said cup having an open end and a closed end, an elongated core coaxially movable into and removable from the molding cup through the open end thereof, cooperating guide means fixed to said molding cup and said core for coaxially aligning said core for coaxial movement into and out of said cup, base means independent of said cup fixed to said core at a first end thereof and projecting laterally therefrom to overlie the open end of said cup and position the core longitudinally within the cup, said core having an external configuration similar to that of the interior of said cup, said core, throughout the length thereof, being of a reduced cross-section relative to the interior of the cup so as to define a molding space completely about a cup received core between the core and the cup, and a stripping plate, said plate being independent of said cup and having an aperture defined therein of a greater cross-section than said core and of a lesser cross-section than said cup, said plate being freely and perpendicularly receivable over and removable from the open end of said cup with the aperture in general coaxial alignment therewith for the perpendicular reception of said core therethrough, the base means of said core overlying said plate, said base means and said plate being perpendicularly movable as a unit away from the open end of the cup a sufficient distance so as to effect a removal of the core from the cup with the plate subsequently being removable from the core to strip a molded bun therefrom.

2. The apparatus of claim 1 wherein said core is of a length less than that of said cup so as to, when received therein, terminate in spaced relation to the closed end of said cup.

3. The apparatus of claim 2 wherein said stripping plate and said base means each have at least one reduced diameter hole defined therethrough adjacent said aperture and within an area bounded by the open end of the cup coaxially aligned with the aperture, said holes being axially aligned with each other.

4. The apparatus of claim 2 wherein said stripping plate and said base means each have at least one reduced diameter hole defined therethrough adjacent said aperture and within an area bounded by the open end of the cup coaxially aligned with the aperture, said holes being axially aligned with each other.

5. The apparatus of claim 4 including a plurality of parallel laterally spaced molding cups, and a plate mounting said cups, said base means mounting a plurality of elongated cores positioned for coaxial movement into and removal from the plurality of cups, and said stripping plate having an aperture defined therein for each of said cores.

6. The apparatus of claim 5 including a plurality of sets of aligned holes through the cup mounting plate, the stripping plate and the core mounting base.

7. Bun molding apparatus comprising a frame, a plurality of molding cups mounted on said frame in spaced parallel relation to each other, said cups each being hollow and having an open end and a closed end, a base member independent of said frame and perpendicularly movable relative to the frame between a first position overlying the open ends of the cups and a second position remote from the cups and frame, a plurality of molding cores fixed to said base member and projecting therefrom for linear coaxial movement into said cups upon a movement of the base member to the first position and for linear coaxial movement to a remote position out of said cups upon a movement of the base member to the second position, one core being received within each cup, said cores being of the same general configuration as the cups and of a reduced size and length relative thereto so as to define a molding space about each core within the corresponding cup, cooperating guide means on said frame and said base member for coaxially aligning said cores for coaxial movement into and out of said cups, and stripping means perpendicularly movable with said base member away from said frame for a simultaneous stripping of a plurality of molded buns from said cores subsequent to a linear coaxial removal of the cores from the cups.

8. The apparatus of claim 7 wherein said stripping means comprises a flat plate independent of said frame and having a plurality of apertures defined therein, said apertures receiving said cores therethrough with the plate seating against the base member, each aperture having a cross-sectional area less than that of the corresponding cup.

9. The apparatus of claim 8 wherein said guide means comprises a plurality of guide rods fixed to said base member and projecting therefrom parallel to said cores, and corresponding aligned guide holes provided through said plate and said cup mounting frame.

References Cited

UNITED STATES PATENTS

| | | | |
|---|---|---|---|
| 2,168,006 | 8/1939 | Strietelmeier | 99—439 |
| 2,267,213 | 12/1941 | Newcomb | 99—383 |
| 3,290,154 | 12/1966 | Turner | 107—54 |

FOREIGN PATENTS 130,890　12/1932　Austria.

WALTER A. SCHEEL, *Primary Examiner.*

A. O. HENDERSON, *Assistant Examiner.*